(12) United States Patent
Tian et al.

(10) Patent No.: US 8,144,784 B2
(45) Date of Patent: Mar. 27, 2012

(54) POSITION CODING FOR CONTEXT-BASED ADAPTIVE VARIABLE LENGTH CODING

(75) Inventors: Dihong Tian, San Jose, CA (US);
Wen-hsiung Chen, Sunnyvale, CA (US); Pi Sheng Chang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1295 days.

(21) Appl. No.: 11/774,745

(22) Filed: Jul. 9, 2007

(65) Prior Publication Data

US 2009/0016440 A1    Jan. 15, 2009

(51) Int. Cl.
*H04N 7/26* (2006.01)
*H04N 11/02* (2006.01)
*G06K 9/46* (2006.01)

(52) U.S. Cl. ......... 375/240.18; 375/240.23; 375/240.16; 382/239; 382/240; 382/245; 382/246

(58) Field of Classification Search ............. 375/240.18, 375/240.23, 240.16; 382/245, 246, 239
See application file for complete search history.

(56) References Cited

U.S. PATENT DOCUMENTS

| | | | |
|---|---|---|---|
| 4,821,119 A | 4/1989 | Gharavi | 375/240.16 |
| 5,640,420 A | 6/1997 | Jung | 375/240 |
| 5,751,232 A | 5/1998 | Inoue et al. | 341/63 |
| 6,477,280 B1 | 11/2002 | Malvar | 382/245 |
| 6,771,828 B1 | 8/2004 | Malvar | 382/240 |
| 6,795,584 B2 | 9/2004 | Karczewicz et al. | 382/239 |
| 2004/0228540 A1 | 11/2004 | Chen et al. | 382/246 |
| 2005/0276499 A1* | 12/2005 | Wu et al. | 382/245 |
| 2006/0039616 A1* | 2/2006 | Chen et al. | 382/232 |
| 2006/0039620 A1* | 2/2006 | Chen et al. | 382/245 |
| 2006/0039621 A1* | 2/2006 | Toebes et al. | 382/245 |
| 2006/0056720 A1* | 3/2006 | Chen et al. | 382/245 |
| 2007/0019877 A1* | 1/2007 | Chen et al. | 382/245 |
| 2007/0121728 A1* | 5/2007 | Wang et al. | 375/240.18 |
| 2007/0217506 A1* | 9/2007 | Yang et al. | 375/240.03 |
| 2007/0230564 A1* | 10/2007 | Chen et al. | 375/240.01 |

FOREIGN PATENT DOCUMENTS

WO    WO 03/090421    10/2003

OTHER PUBLICATIONS

Bjontegaard, Gisle and Karl Lillevold. "Context-adaptive VLC (CVLC) coding of coefficients", May 2002.*
Iain Richardson, "H.264 / MPEG-4 Part 10 White Paper: Variable-Length Coding," VCodex (www.vcodex.com), Oct. 2, 2002, Retrieved Jun. 26, 2007 at www.rgu.ac.uk/files/h264_vlc.pdf.

* cited by examiner

*Primary Examiner* — Michael Simitoski
(74) *Attorney, Agent, or Firm* — Dov Rosenfeld; Inventek

(57) ABSTRACT

Particular embodiments include a method, an apparatus, and logic embodied in tangible computer-readable medium that when executed carries out a method of encoding an ordered sequence of quantized transform coefficients of a block of image data. One embodiment is a context adaptive variable length coding method that includes position coding the positions of zero-valued and non-zero valued coefficients by either a mixed method that encodes either the run length of zeroes preceding a non-zero coefficient or the run length of nonzero-valued coefficients preceding a zero-valued coefficients. Another includes position coding that uses a variable length code for two parameters respectively indicating the number of zero-valued coefficient positions and nonzero-valued coefficient positions still to be coded.

26 Claims, 8 Drawing Sheets

```
IF (CoeffsLeft == 0 OR ZerosLeft == 0)
    Stop;
ELSE IF ( (ZerosLeft > 6 AND CoeffsLeft > 6) OR
         (ZerosLeft <= CoeffsLeft) )
    Code run_before_n(i);
    CoeffsLeft = CoeffsLeft - 1;
    ZerosLeft = ZerosLeft - run_before_n(i);
    i = i - run_before_n(i) - 1;
ELSE
    Code run_before_z(j);
    CoeffsLeft = CoeffsLeft - run_before_z(j);
    ZerosLeft = ZerosLeft - 1;
    j = j + run_before_z(j) + 1;
END
```

```
IF (CoeffsLeft == 0 OR ZerosLeft == 0)
      Stop;
ELSE IF ( (ZerosLeft > 6 AND CoeffsLeft > 6) OR
          (ZerosLeft <= CoeffsLeft) )
      Code run_before_n(i);
      CoeffsLeft = CoeffsLeft - 1;
      ZerosLeft = ZerosLeft - run_before_n(i);
      i = i - run_before_n(i) - 1;
ELSE
      Code run_before_z(j);
      CoeffsLeft = CoeffsLeft - run_before_z(j);
      ZerosLeft = ZerosLeft - 1;
      j = j + run_before_z(j) + 1;
END
```

FIG. 2

Table 1: Sample VLC tables for run_before_*
("*" stands for "n" or "z")

| run_before_n or run_before_z | ZerosLeft (if ZerofLeft $\leq$ CoeffsLeft) or CoeffsLeft (if ZerofLeft > CoeffsLeft) | | | | | | |
|---|---|---|---|---|---|---|---|
| | 1 | 2 | 3 | 4 | 5 | 6 | >6 |
| 0 | $c_1(0)$ | $c_2(0)$ | $c_3(0)$ | $c_4(0)$ | $c_5(0)$ | $c_6(0)$ | $c_7(0)$ |
| 1 | $c_1(1)$ | $c_2(1)$ | $c_3(1)$ | $c_4(1)$ | $c_5(1)$ | $c_6(1)$ | $c_7(1)$ |
| 2 | - | $c_2(2)$ | $c_3(2)$ | $c_4(2)$ | $c_5(2)$ | $c_6(2)$ | $c_7(2)$ |
| 3 | - | - | $c_3(3)$ | $c_4(3)$ | $c_5(3)$ | $c_6(3)$ | $c_7(3)$ |
| 4 | - | - | - | $c_4(4)$ | $c_5(4)$ | $c_6(4)$ | $c_7(4)$ |
| 5 | - | - | - | - | $c_5(5)$ | $c_6(5)$ | $c_7(5)$ |
| 6 | - | - | - | - | - | $c_6(6)$ | $c_7(6)$ |
| 7 | - | - | - | - | - | - | $c_7(7)$ |
| 8 | - | - | - | - | - | - | $c_7(8)$ |
| 9 | - | - | - | - | - | - | $c_7(9)$ |
| 10 | - | - | - | - | - | - | $c_7(10)$ |
| 11 | - | - | - | - | - | - | $c_7(11)$ |
| 12 | - | - | - | - | - | - | $c_7(12)$ |
| 13 | - | - | - | - | - | - | $c_7(13)$ |
| 14 | - | - | - | - | - | - | $c_7(14)$ |

FIG. 3

Table 2: Integrated zero/nonzero-position VLC table for (ZerosLeft, CoeffsLeft) = (2, 1)

| Symbol Index | Coefficient Pattern | Codeword |
|---|---|---|
| 0 | 00x | 00 |
| 1 | 0x0 | 01 |
| 2 | x00 | 1 |

FIG. 4

Table 3: The sizes of integrated zero/nonzero-position VLC tables for different (ZerosLeft, CoeffsLeft)

| ZerosLeft | CoeffsLeft | | | | | |
|---|---|---|---|---|---|---|
| | 1 | 2 | 3 | 4 | 5 | 6 |
| 1 | 2 | 3 | 4 | 5 | 6 | 7 |
| 2 | 3 | 6 | 10 | 15 | 21 | 28 |
| 3 | 4 | 10 | 20 | 35 | 56 | 84 |
| 4 | 5 | 15 | 35 | 70 | 126 | 210 |
| 5 | 6 | 21 | 56 | 126 | 252 | 462 |
| 6 | 7 | 28 | 84 | 210 | 462 | 924 |

FIG. 5

```
IF ( (ZerosLeft > 6 AND CoeffsLeft > 0) OR
     (ZerosLeft > 0 AND CoeffsLeft > 6) )
          Code run_before_n(x);
          CoeffsLeft = CoeffsLeft - 1;
          ZerosLeft = ZerosLeft - run_before_n(x);
          i = i - run_before_n(i) - 1;
END
```

FIG. 6

POSITION CODING FOR CONTEXT-BASED ADAPTIVE VARIABLE LENGTH CODING

FIELD OF THE INVENTION

The present disclosure relates generally to image and video compression.

BACKGROUND

ITU-T Recommendation H.264/MPEG-4 Part 10/AVC for advanced video coding includes transforming image blocks, e.g., 4×4 blocks, quantizing the coefficients, ordering the (quantized) coefficients to a sequence of ordered quantized coefficients, and then encoding the ordered sequence of quantized coefficients by what is called entropy coding. The standard specifies two types of entropy coding: Context-based Adaptive Binary Arithmetic Coding (CABAC) and context-based adaptive variable length coding (CAVLC). The latter is included in the Baseline Profile of H.264. CAVLC as defined in H.264 encodes the ordered quantized coefficients of a 4×4 block in a reverse order. In other words, the ordered sequence of quantized coefficients starts with the nonzero coefficient with the highest frequency and progresses the coefficient at the lowest frequency.

CAVLC uses a one-dimensional position coding scheme to code the positions of nonzero coefficients, e.g., the length of a run of zero-valued coefficients preceding a nonzero-valued coefficient. The existing position coding scheme for CAVLC includes selecting variable length coding tables that depend only on the number of zeros remaining. The number of non-zero coefficients remaining, although also known to both the encoder and decoder, is not typically used in the coding process.

BRIEF DESCRIPTION OF THE DRAWINGS

FIG. 2 shows one embodiment of code that performs operations repeatedly until the positions of all the coefficients are determined as part of one embodiment of context-adaptive variable length coding using mixed run-length position coding.

FIG. 3 shows an example set of one-dimensional VLC tables for using an embodiment of mixed run-length position coding.

FIG. 4 show as Table 2 an example VLC table for the case of two zero valued coefficients and one nonzero-valued coefficient whose position remains to be encoded, the VLC table arranged to assign codewords to the three coefficient position patterns possible for this case.

FIG. 5 shows Table 3 that indicates the sizes of all VLC tables for different parameters indicative of the numbers of zero valued coefficients and nonzero-valued coefficients whose position remains to be encoded.

FIG. 6 shows example code used for position coding in one embodiment of an integrated position coding method that includes first repeatedly performing the code shown.

DESCRIPTION OF EXAMPLE EMBODIMENTS

Overview

Figure 1:
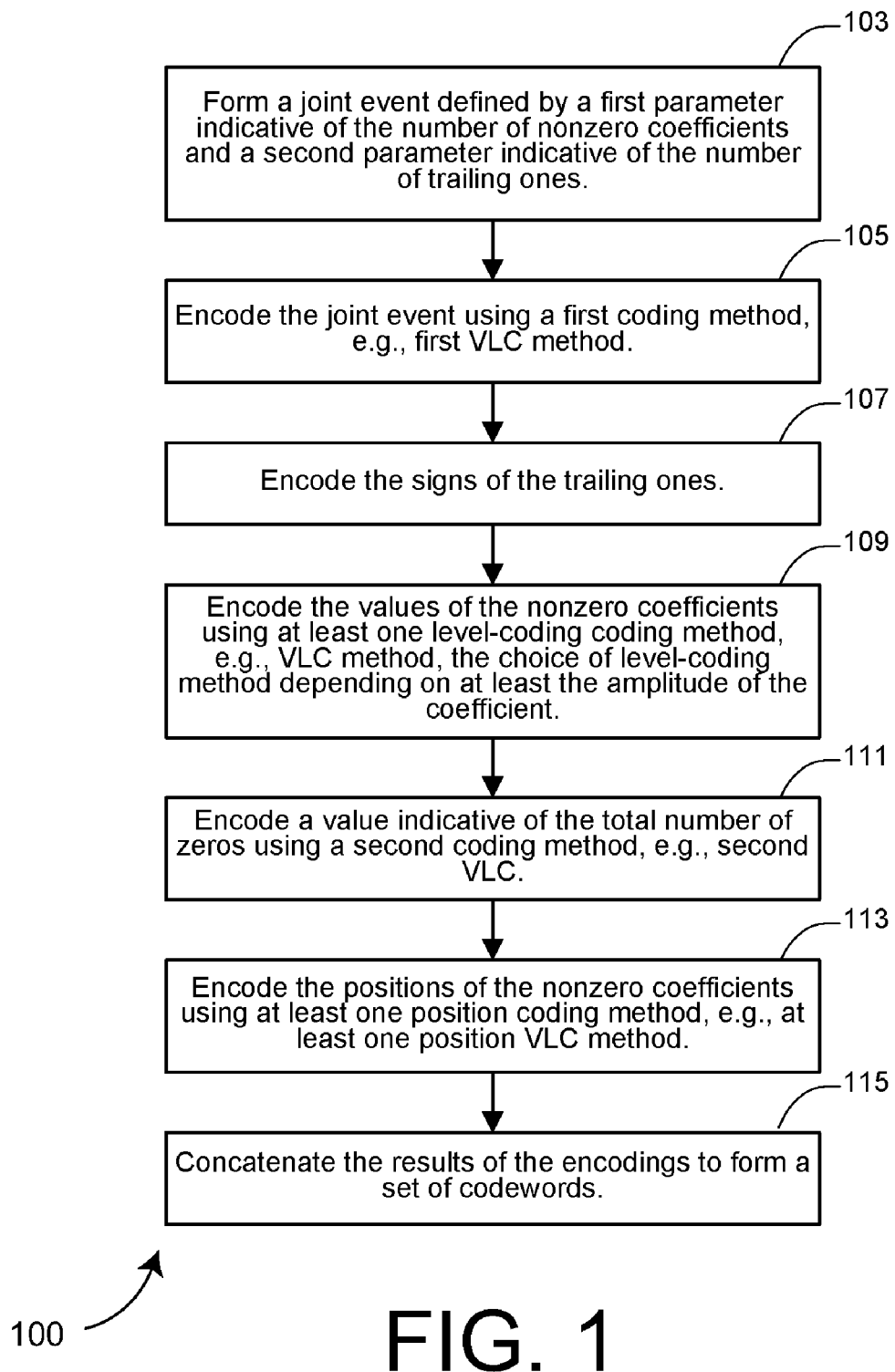
FIG. 1 shows a flowchart of one embodiment 100 of a generalization of context-adaptive variable length coding for coding an ordered sequence of quantized transform coefficients.

Embodiments of the present invention include a method, an apparatus, and logic encoded in one or more computer-readable tangible medium to carry out a method. The method is to encode an ordered sequence of quantized transform coefficients of a block of image data.

Particular embodiments include a method comprising: encoding an ordered sequence of quantized transform coefficients of a block of image data, the sequence having a most likely-to-occur amplitude, and at least one other amplitude including a next-to-most likely-to-occur amplitude. In some embodiments, 0 is the most likely-to-occur amplitude, and 1 is the next most likely-to-occur amplitude. The method includes forming a joint event defined by a first parameter indicative of the number of coefficients having other than the most likely-to-occur amplitude and a second parameter indicative of the number of trailing coefficients having the next-to-most likely-to-occur amplitude. The method further includes encoding the joint event using a first coding method; encoding the signs of the trailing coefficients having the next-to-most likely-to-occur amplitude; encoding the values of the coefficients having other than the most likely-to-occur amplitude using at least one level-coding coding method, the choice of level-coding method depending on at least the amplitude of the coefficient; and encoding a value indicative of the total number of coefficients having the most likely-to-occur amplitude using a second coding method. The method further includes encoding the positions of the coefficients having a value other than the most likely-to-occur amplitude using at least one position coding method; and concatenating the results of the encodings to form a set of codewords. The position encoding is selected from the set of position coding methods consisting of: a first position coding method including repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other; and a second position coding method including determining a first parameter and a second parameter that are indicative of the number of zero-valued coefficients and the number of nonzero valued coefficients whose positions remain to be coded; and jointly encoding the positions of the coefficients according to the first and second parameters using a variable length coding mapping that provides for any pair of parameter values all possible patterns that have those parameter values. The method is configured such that relatively more likely-to-occur sequences of quantized coefficients are represented by relatively short sets of codewords and relatively less likely-to-occur sequences of quantized coefficients are represented by relatively long sets of codewords.

Particular embodiments include a method comprising: transforming a block of image data to obtain a set of coefficients; quantizing the set of coefficients to obtain a set of quantized transform coefficients, such that the set of quantized transform coefficients has a most likely-to-occur amplitude, and at least one other amplitude including a next-to-most likely-to-occur amplitude; and ordering the set of quantized transform coefficients to obtain an ordered sequence of quantized transform coefficients of the block of image data. The method includes encoding the sequence of quantized transform coefficients using a context-based adaptive variable length coding method, the context-based adaptive variable length coding method including encoding the positions of the coefficients having a value other than the most likely-to-occur amplitude using at least one position coding method selected from the set of position coding methods consisting of: a first position coding method including repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other; and a second position coding method including determining a first parameter and a second parameter that are indicative of the number of most likely-to-occur amplitude coefficients and the number of coefficients having other than the most likely-to-occur amplitude whose positions remain to be coded; and jointly encoding the positions of the coefficients according to the first and second parameters using a variable length coding mapping that provides for any pair of parameter values all possible patterns that have those parameter values. The method is such that relatively more likely-to-occur sequences of quantized coefficients are represented by relatively short sets of codewords and relatively less likely-to-occur sequences of quantized coefficients are represented by relatively long sets of codewords. In some embodiments, the quantizing is such that zero is the most likely-to-occur amplitude and 1 is the next to most likely-to-occur amplitude.

Particular embodiments include logic encoded in one or more tangible media for execution and when executed operable to carry out a method comprising encoding for an ordered sequence of quantized transform coefficients of a block of image data, the sequence having a most likely-to-occur amplitude, and at least one other amplitude including a next-to-most likely-to-occur amplitude, encoding the ordered sequence using a context-based adaptive variable length coding method. The context-based adaptive variable length coding method includes encoding the positions of the coefficients having a value other than the most likely-to-occur amplitude using at least one position coding method selected from the set of position coding methods consisting of: a first position coding method including repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other; and a second position coding method including determining a first parameter and a second parameter that are indicative of the number of most likely-to-occur amplitude coefficients and the number of coefficients having other than the most likely-to-occur amplitude whose positions remain to be coded; and jointly encoding the positions of the coefficients according to the first and second parameters using a variable length coding mapping that provides for any pair of parameter values all possible patterns that have those parameter values. The logic is such that relatively more likely-to-occur sequences of quantized coefficients are represented by relatively short sets of codewords and relatively less likely-to-occur sequences of quantized coefficients are represented by relatively long sets of codewords. In some embodiments, the sequence is such that zero is the most likely-to-occur amplitude and 1 is the next to most likely-to-occur amplitude.

Particular embodiments include an apparatus comprising: a context-based adaptive variable length encoder operative to encode an ordered sequence of quantized transform coefficients of a block of image data, the sequence having a most likely-to-occur amplitude, and at least one other amplitude including a next-to-most likely-to-occur amplitude, the context-based adaptive variable length encoder including a position encoder operative to encode the positions of the coefficients having a value other than the most likely-to-occur amplitude using at least one position coding method selected from the set of position coding methods consisting of: a first position coding method including repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other; and a second position coding method including determining a first parameter and a second parameter that are indicative of the number of most likely-to-occur amplitude coefficients and the number of coefficients having other than the most likely-to-occur amplitude whose positions remain to be coded; and jointly encoding the positions of the coefficients according to the first and second parameters using a variable length coding mapping that provides for any pair of parameter values all possible patterns that have those parameter values, such that relatively more likely-to-occur sequences of quantized coefficients are represented by relatively short sets of codewords and relatively less likely-to-occur sequences of quantized coefficients are represented by relatively long sets of codewords.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Note also that in the description herein, it is assumed that the quantized transform coefficients have 0 as the most-likely-to-occur quantized value, and one as the next most-likely-to-occur quantized coefficient amplitude. The methods, apparatuses and logic described herein is applicable to ordered sequences in which there is another most-likely-to-occur quantized coefficient amplitude, and also a different next most-likely-to-occur quantized coefficient amplitude. How to modify the description and methods described herein to accommodate such an ordered sequence would be straightforward to one of ordinary skill in the art.

Note also that in the description herein, coding only the non-DC ("AC") coefficients is described. The DC coefficient is assumed to be separately encoded. How to modify the methods, apparatuses, and/or logic described would be clear to one in the art.

Context-Based Adaptive Variable Length Coding (CAVLC)

Briefly consider an ordered sequence of quantized transform coefficients of a 4 by 4 block of image data, and suppose, as in the remainder of this description, not limiting the applicability of the invention, that 0 is the most likely-to-occur ("most-likely-to-occur") amplitude, and 1 is the next to most-likely-to-occur amplitude value. Suppose also that the coding is only of the non-DC (the "AC") transform coefficients, so that there are 15 such transform coefficients indexed by an index 0, . . . , 14.

CAVLC takes advantage of several characteristics of quantized 4×4 blocks, including that the ordered series are typically sparse, (containing mostly zeros. CAVLC uses run-level coding to compactly represent strings of zeros. CAVLC also advantageously uses that the highest nonzero coefficients in the ordering often have an amplitude of 1. The number of high-frequency amplitude-1 coefficients is called the "Trailing 1s", "T1s" or "TrailingOnes"), and are encoded in a compact way. One implementation allows only up to three TrailingOnes. Any more are treated as if they have a nonzero amplitude greater than 1. CAVLC also advantageously uses that the number of nonzero coefficients in neighboring blocks is correlated. The number of coefficients is encoded using a look-up table; the choice of look-up table depends on the number of nonzero coefficients in neighboring blocks. CAVLC also advantageously uses that the magnitude of nonzero coefficients tends to be higher at the start ordered sequence near the DC coefficient and lower towards the higher frequencies. CAVLC takes advantage of this by adapting the choice of VLC look-up table for a "level" parameter depending on recently-coded level magnitudes.

FIG. 1 shows one embodiment 100 of a generalization of CAVLC for coding such an ordered sequence of quantized transform coefficients. The method 100 includes:

(1) In 103 forming a joint event defined by two parameters: (a) the number of nonzero coefficients, denoted as Total-Coeffs, and (b) the number of trailing amplitude-one coefficients, denoted as TrailingOnes—up to a TrailingOnes value of three—as a pair. The joint event is denoted by coeff token. Any trailing ones other than the last three treated an non-amplitude 1. The method 100 further includes in 105 encoding the joint event, e.g., using a first VLC method, e.g., using a first 2-D VLC table.

(2) In 107, encoding the sign of each trailing one, denoted TrailingOne_sign(i), where is an index denoting the location of the TrailingOne, e.g., by a single bit, e.g., 0 for "+", 1=for"–", the encoding starting with the highest frequency TrailingOne. Recall, there can only be three training ones, the remaining ones are treated as non-amplitude-one coefficients.

(3) In 109, encoding the values of the remaining nonzero coefficients in a reverse order, with Level(i) denoting the level of a nonzero amplitude coefficient in index location i, including the sign, encoding of each level in one implementation using a level coding method, e.g., a variable length coding (VLC) method, e.g., using a VLC table selected from a number, e.g., seven VLC tables to encode each value adapts depending on the magnitude of each successive coded value. This is what is called the context adaptive property, with the VLC tables denoted Level_VLC0 to Level_VLC6, with Level_VLC0 biased towards lower magnitudes; Level_VLC1 is biased towards slightly higher magnitudes and so forth.

(4) In 111, encoding the total number of zeros before the last coefficient, with TotalZeros denoting the sum of all zeros preceding the highest nonzero coefficient in the ordered sequence, and the coding in one implementation using VLC.

(5) In 113, encoding the position of the nonzero coefficients by encoding the number of zeros (the run-length) preceding each nonzero coefficient, denoted run-before, such encoding in reverse order, with a run_before parameter encoded before each nonzero coefficient, starting with the highest frequency, except:
  (a) if there are no more zeros left to encode, [run before]= TotalZeros, it is not necessary to encode any more run_before values, and
  (b) it is not necessary to encode run_before for the final (lowest frequency) nonzero coefficient.

The encoding of the position of 113 uses a position encoding method that in this embodiment is a VLC coding method to encode numbers, i.e., run-lengths of preceding zeros, using VLC tables. The VLC for each run of zeros in 113 is chosen depending on (a) the number of zeros that have not yet been encoded, denoted ZerosLeft, and (b) the values of run_before.

(6) In 115, concatenating the codewords produced by the encodings to form a set of codewords—the bitstream—for the ordered sequence of coefficients.

The encodings that usually are by variable length coding, e.g., using one or another variable length coding method use tables that take into account measured or assumed statistics of occurrences.

The encodings that usually are by variable length coding, e.g., using one or another variable length coding method use tables that take into account measured or assumed statistics of occurrences.

Thus, relatively more likely-to-occur sequences of quantized coefficients are represented by relatively short sets of codewords and relatively less likely-to-occur sequences of quantized coefficients are represented by relatively long sets of codewords.

Consider the following simple example sequence to demonstrate the steps.

The Example Sequence

| Frequency Index: | 0 | 1 | 2 | 3 | 4 | 5 | 6 | 7 | 8 | 9 . . . 14 |
|---|---|---|---|---|---|---|---|---|---|---|
| AC Co-eficients: | 3 | 1 | 0 | 0 | 0 | –2 | 1 | 0 | 0 | 1 . . . (all zeros) |

Conventional CAVLC for the Example Sequence

For the above example, the following are the parameters:
TotalCoeffs=5 (highest frequency index 9, lowest frequency index 0).
TrailingOnes=2.
TrailingOne_sign(9)'='.
TrailingOne_sign(6)'='.
Level(5)='–2'; one encodes by an appropriate Level_VLCk, k=0 to 6 ..
Level(1)='+1'; again encode by one of the seven VLC tables.
Level(0)='+3'; again encode by one of the seven VLC tables.
TotalZeros=5 (position coding starts here).
ZerosLeft=5, run_before(9)=2 (two zeros before the highest frequency coefficient).
ZerosLeft=3, run_before(6)=0 (no zero; consecutive non-zero coefficients).
ZerosLeft=3, run_before(5)=3.
ZerosLeft=0, run_before(1)=0 (no code required; no zero left).

When coding the above parameters using conventional CAVLC, one codeword is used to encode denoted by coeff_token that includes TotalCoeffs and TrailingOnes as a pair. The remaining parameters are encoded separately, and the resulting bitstream is the concatenation of the corresponding codewords. Note that the last value of run_before does not need a codeword because both the total numbers of coefficients and zeros have been coded, from which the decoder can derive the position of the last nonzero-value coefficient(s).

As can be seen from the example, conventional CAVLC uses a one-dimensional position coding scheme in 113 to code the positions of nonzero coefficients, which are represented by run_before(i) denoting the run of zeros preceding the nonzero coefficient with index i, i=0, 1, . . . , $(N^2-2)$ for an N by N block, with, in the implementation shown, i=0 denoting the first nonzero coefficient. In the example above, three values of run_before need to be coded, among which the zero value corresponds to the two consecutive nonzero coefficients at index values i=6 and i=5.

Since both the total numbers of coefficients and the zero valued coefficients are coded in the bitstream, a decoder can derive the numbers of remaining coefficients and zeros while decoding every codeword. The position coding scheme of the above described conventional CAVLC method includes selecting VLC tables only depending on the number of zeros remaining, i.e., on ZerosLeft. The number of nonzero coefficients remaining, although also known or determinable to both the encoder and decoder, is not used in the coding process.

The inventors have observed that by accounting for both the nonzero coefficients and zeros remaining to be coded and an observation that nonzero coefficients statistically appear more often at lower frequency indices, more efficient position coding schemes can be developed.

A First Embodiment using Mixed Run-Length Position Coding

A first position coding method used with a first modified CAVLC embodiment includes what we call a "mixed run-length position coding" method in the encoding of the positions of nonzero coefficients.

Instead of solely coding the run-lengths of zeros, one mixed coding method embodiment includes repeating encoding either a run-length of a run of zeros or a run-length of a run of nonzero coefficients, one or the other, depending on the numbers of zeros and nonzero coefficients remaining to be coded. In doing so, two notations are introduced:
 (a) Let run_before_n(i) denote the run-length of zero-value coefficients preceding a nonzero-value coefficient at index i. It is the same as "run_before(i)".
 (b) Let run_before_(j) denote the run-length of nonzero-value coefficients starting from index j, and ending at a zero-value coefficient moving forwards towards higher frequencies. For example, run_before_z(0)=2 in the above described sample sequence, which indicates the two nonzero coefficients at the beginning of the sequence.

During position coding 113, one embodiment includes maintaining two variables: ZerosLeft and CoeffsLeft that respectively indicate the numbers of zeros and nonzero coefficients of which the positions have not been encoded. Initially, because the position of the highest-frequency nonzero coefficient is implicitly encoded if TotalZeros and TotalCoeffs are known, in one embodiment,
 ZerosLeft=TotalZeros, and
 CoeffsLeft=TotalCoeffs−1.

So that encoding of a run of zeros before a non-zero coefficient proceeds from the highest frequency non-zero coefficient towards the lower frequencies, and any encoding of a run of nonzero valued coefficients preceding a zero-valued coefficient starts from the lowest frequency towards the higher frequencies, at the beginning of the coding process, set indices:
 i=TotalCoeffs+TotalZeros−1, and
 j=0.

FIG. 2 shows one embodiment of code that performs operations repeatedly until the positions of all the coefficients are determined as part of one embodiment of the coding process. In one embodiment, the process described by the code of FIG. 2 is repeated until the positions of all the coefficients are determined:

The coding of "run_before_n(i)" and "run_before_(j)" in the implementation of FIG. 2 are "symmetric" and share the same variable length code (VLC) tables, shown in FIG. 3 as Table 1. Alternate embodiments use different tables to encode run_before_n(i) and run_before_(j).

Table 1 shows sample VLC tables for run_before_n in the case ZerosLeft≦CoeffsLeft, and for run_before_z in the case ZerosLeft>CoeffsLeft. In Table 1, each row is for a different value of run_beforen for different values of ZerosLeft, or run_before_z for different values of CoeffsLeft. Thus, the codes are denoted $C_k(m)$, where k denotes run_before_n and m denotes ZerosLeft in the case in the case ZerosLeft≦CoeffsLeft, or where k denotes run_before_z and m denotes CoeffsLeft in the case in the case ZerosLeft>CoeffsLeft.

Thus Table 1 for FIG. 2 has the same formulation as the VLC tables that are used in H.264/AVC for coding the value of "run_before". However, codewords will be re-assigned and optimized for the new position coding scheme. Each column in Table 1 represents a one-dimensional VLC table for a given value of ZerosLeft (or CoeffsLeft). The smaller value of the two variables, ZerosLeft and CoeffsLeft, determines which symbol ("run_before_n" or "run_before z") is being coded and which one dimensional VLC table is used to code the symbol.

Consider again the 4×4 block whose AC quantized transform coefficients are as follows:

| Frequency Index: | 0 | 1 | 2 | 3 | 4 | 5 | 6 | 7 | 8 | 9 . . . 14 |
|---|---|---|---|---|---|---|---|---|---|---|
| AC Coefficients: | 3 | 1 | 0 | 0 | 0 | −2 | 1 | 0 | 0 | 1 . . . (all zeros) |

For this example sequence, the following are the parameters for one embodiment f using mixed run-length position coding:
 TotalCoeffs=5
 . . . <as before>
 TotalZeros=5 (position coding starts here)
 ZerosLeft=5>CoeffsLeft=4, i=9, j=0, run_before_(j)=2
 ZerosLeft=4>CoeffsLeft=2, i=9, j=3, run_before_(j)=0
 ZerosLeft=3>CoeffsLeft=2, i=9, j=4, run_before_(j)=0
 ZerosLeft=2=CoeffsLeft=2, i=9, j=5, run_before n(j)=2
 ZerosLeft=0, CoeffsLeft=1, Stop The final codeword stream for the non-zero-valued coefficient positions (step 113 of FIG. 1) is:

$$C_4(2)+C_2(0)+C_2(0)+C_2(2),$$

where +denotes concatenation.

Here is another example in which only one type of run length coding is used in the mixed run-length position coding:

| Frequency Index: | 0 | 1 | 2 | 3 | 4 | 5 | 6 | 7 | 8 | 9 . . . 14 |
|---|---|---|---|---|---|---|---|---|---|---|
| AC Coefficients: | 3 | 1 | 2 | 0 | 0 | 0 | −1 | 1 | 0 | 1 . . . (all zeros) |

The coding parameters are:
 TotalCoeffs=6
 . . .
 TotalZeros=4(position coding starts here)
 ZerosLeft=4, CoeffsLeft=5, i=9, j=0, run_before_n(i)=1
 ZerosLeft=3, CoeffsLeft=4, i=7, j=0, run_before_n(i)=0
 ZerosLeft=3, CoeffsLeft=3, i=6, j=0, run_before_n(i)=3
 ZerosLeft=0, CoeffsLeft=2, Stop Here is yet another example in which both types of run length coding are used in the mixed run-length position coding:

| Frequency Index: | 0 | 1 | 2 | 3 | 4 | 5 | 6 | 7 | 8 | 9 ... 14 |
|---|---|---|---|---|---|---|---|---|---|---|
| AC Co-efficients: | 3 | 1 | 0 | 0 | 0 | 0 | -2 | -1 | 1 | 0 ... (all zeros) |

The coding parameters are:
TotalCoeffs=5
...
TotalZeros=4(position coding starts here)
ZerosLeft=4, CoeffsLeft=4, i=8, j=0, run_before_(j)=0
ZerosLeft=4, CoeffsLeft=3, i=7, j=0, run_before_(j)=2
ZerosLeft=3, CoeffsLeft=1, i=7, j=3, run_before_(j)=0
ZerosLeft=2, CoeffsLeft=1, i=7, j=4, run_before_(j)=0
ZerosLeft=1, CoeffsLeft=1, i=7, j=5, run_before_(j)=0
ZerosLeft=0, CoeffsLeft=1, Stop

A Second Embodiment using an Integrated Position Coding Method

A second position coding method used with a second modified CAVLC embodiment includes what we call an integrated zero/nonzero-position coding method for the position coding.

The above described mixed run-length position coding method uses one-dimensional VLC to encode either a run-length of zero coefficients or a run-length of nonzero coefficients, one or the other, one at a time. One alternate embodiment includes encoding the positions of zero and nonzero coefficients concurrently using multi-dimensional VLC. Such an integrated coding scheme might achieve further improved coding efficiency of the coefficient positions compared.

As in the mixed run-length position coding description above, consider the two parameters, TotalZeros and TotalCoeffs that are indicative of the number of zero-valued coefficients and nonzero valued coefficients remaining to be coded. One embodiment includes implicitly coding the position of the highest-frequency nonzero coefficient. The numbers of coefficients of which the positions are remaining to be coded are:
ZerosLeft=TotalZeros, and
CoeffsLeft=TotalCoeffs-1.

One embodiment of the integrated coding method includes constructing a VLC code map, e.g., a VLC table for each combination of (ZerosLeft, CoeffsLeft). For each pair of values (ZerosLeft, CoeffsLeft), a VLC table is constructed that provides a respective codeword for each of the possible position patterns that have ZerosLeft zero-valued coefficients, and CoeffsLeft non-zero-valued coefficients. Each such VLC table is constructed either by gathering statistics from actual data, or by assuming statistics, e.g., from data of other images. Each VLC table provides a codeword to each possible zero/nonzero-position pattern, e.g., based on the position pattern's actual or assumed statistics. For example, when ZerosLeft=2 and CoeffsLeft=1, there are a total number of three possible coefficient position patterns. FIG. 4 show as Table 2 an example VLC table for (ZerosLeft, CoeffsLeft)=(2,1) that assigns codewords to the three coefficient position patterns. In Table 2, "x" denotes a nonzero-valued coefficient and the coefficient position pattern shows the possible appearance of zero and nonzero coefficients in the remaining sequence, starting from the lowest frequency to the highest. In this example, a shorter codeword is assigned to position pattern "x00", which makes sense as the lowest-frequency coefficient has a larger probability to appear as nonzero.

One can readily show that for given (ZerosLeft, CoeffsLeft), the size of the VLC table for integrated zero/nonzero-position coding is the combination number of choosing ZerosLeft (or equivalently, CoeffsLeft,) out of (ZerosLeft+CoeffsLeft). One embodiment includes limiting the maximum value of each of the parameters to be a value denoted MaxValue. In one embodiment, MaxValue=6. In such a case, the maximum size of the VLC table is:

$$\binom{12}{6} = 924,$$

where $$\binom{n}{k}$$

denotes the choose function "n choose k", the number of ways of choosing k out of n. FIG. 5 shows Table 3 that indicates the sizes of all VLC tables for different (ZerosLeft, CoeffsLeft) pairs, with ZerosLeft≦6 and CoeffsLeft≦6.

Assuming that all the code tables in Table 3 (FIG. 5) have been constructed, e.g., from actual or assumed statistics, one embodiment of the position coding step 113 of FIG. 1 includes starting with ZerosLeft=TotalZeros, CoeffsLeft=TotalCoeffs-1, and x=TotalCoeffs+TotalZeros-1.

The position coding step of one embodiment of the method includes first repeatedly performing a step, shown in FIG. 6 as program code, until ZerosLeft≦6 and CoeffsLeft≦6, or until the step stops if one of the two variables reaches zero during the method.

The zero/nonzero positions of the remaining coefficients are then coded concurrently as one symbol using the multi-dimensional VLC table selected according to the present values of the two variables, ZerosLeft and CoeffsLeft.

As an example, consider again the 4×4 block whose AC quantized transform coefficients are as follows:

| Frequency Index: | 0 | 1 | 2 | 3 | 4 | 5 | 6 | 7 | 8 | 9 ... 14 |
|---|---|---|---|---|---|---|---|---|---|---|
| AC Co-efficients: | 3 | 1 | 0 | 0 | 0 | -2 | 1 | 0 | 0 | 1 ... (all zeros) |

For this example sequence, the following are the parameters for one embodiment f using mixed run-length position coding:
TotalCoeffs=5
... <as before>
TotalZeros=5 (position coding starts here)
ZerosLeft=5, CoeffsLeft=4, CoeffPttn='xx000xx00',
Stop,
where CoeffPttn is the coefficient position pattern.
In other words, the positions of the zero and nonzero coefficients are encoded by only one codeword: C5,4

('xx000xx00'), where C5,4 denotes the VLC table constructed for (ZerosLeft, CoeffsLeft)=(5, 4).

Thus, for each pair of values (ZerosLeft, CoeffsLeft), one embodiment includes using a VLC table that includes all possible position patterns that have ZerosLeft zero-valued coefficients, and CoeffsLeft non-zero-valued coefficients to encode the position.

One embodiment includes using such VLC tables repeatedly for up to a number denoted MaxValue for each of ZerosLeft and CoeffsLeft, e.g., 6 in order to limit the number of possible VLC tables and the number of possible combinations encoded by the VLC tables, i.e., to limit the size of the possible VLC tables.

Decoding

While the above descriptions were mostly of coding methods, those in the art will understand that the present description also leads to decoding methods and apparatuses that decode a bitstream that was coded by any of the coding embodiments described herein. The decoding method includes accepting a bitstream including codewords encoded by the coding method described above, including recognizing codewords in the bitstream and decoding the codewords.

Apparatuses

Particular embodiments include an apparatus comprising: a context-based adaptive variable length encoder operative to encode an ordered sequence of quantized transform coefficients of a block of image data, the sequence having a most likely-to-occur amplitude, and at least one other amplitude including a next-to-most likely-to-occur amplitude, the context-based adaptive variable length encoder including a position encoder operative to encode the positions of the coefficients having a value other than the most likely-to-occur amplitude using at least one position coding method selected from the set of position coding methods consisting of: a first position coding method including repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other; and a second position coding method including determining a first parameter and a second parameter that are indicative of the number of most likely-to-occur amplitude coefficients and the number of coefficients having other than the most likely-to-occur amplitude whose positions remains to be coded; and jointly encoding the positions of the coefficients according to the first and second parameters using a variable length coding mapping that provides for any pair of parameter values all possible position patterns that have those parameter values, such that relatively more likely-to-occur sequences of quantized coefficients are represented by relatively short sets of codewords and relatively less likely-to-occur sequences of quantized coefficients are represented by relatively long sets of codewords.

Figure 7:
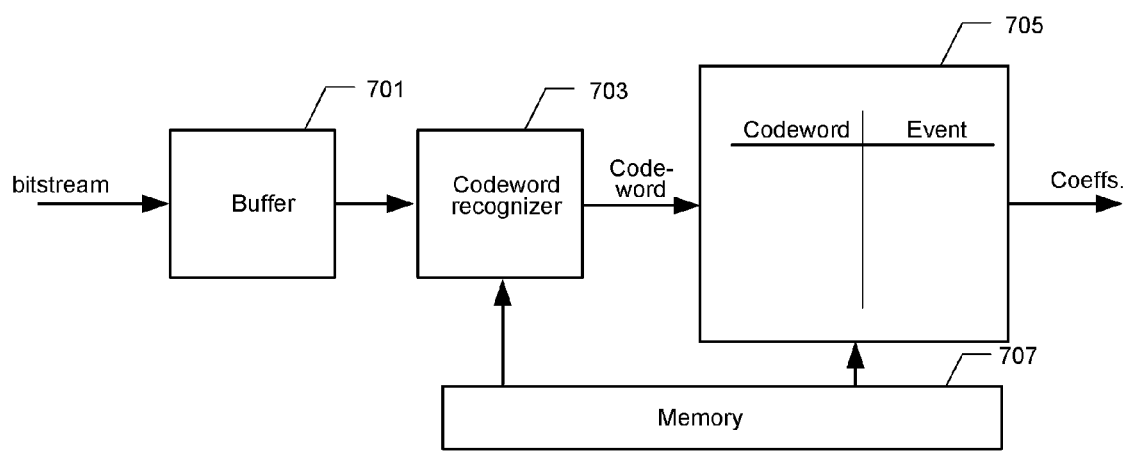
FIG. 7 shows one embodiment of a decoder.

FIG. 7 shows one embodiment of a decoder. The apparatus includes an input buffer 701 that is operable to accept a bitstream encoded by a compression method that includes any of the coding method embodiments described herein.

The output of the buffer acts as input to a codeword recognizer 703 that accepts the bits of the input bitstream and that is operable to determine which of the coding tables the codeword is from. A decoder 705 is coupled to the codeword recognizer 703 and is operable to determine the data for the codeword recognized by the codeword recognizer, including, for any of the position coding methods described herein, a codeword recognizer that can ascertain the position of the nonzero or zero valued coefficients, depending on the position coding used. The codeword recognizer also recognizes other codewords that encode other parameters encoded by the coding method, including the nonzero values, the number of trailing value-one coefficients, and so forth. In one embodiment, the decoder 705 includes a lookup device that looks up the appropriate decoding table stored in a memory 707. That table provides the event for at least some of the codewords of the set of codewords. Other codewords may include an "escape" code, so that decoding is by other than a table lookup method.

While in the embodiment shown in FIG. 7, the memory is shown separate from the lookup device (decoder) 705, those in the art will understand that in other embodiments, the lookup device 705 includes memory for the tables, and such other embodiments are included herein.

Figure 8:
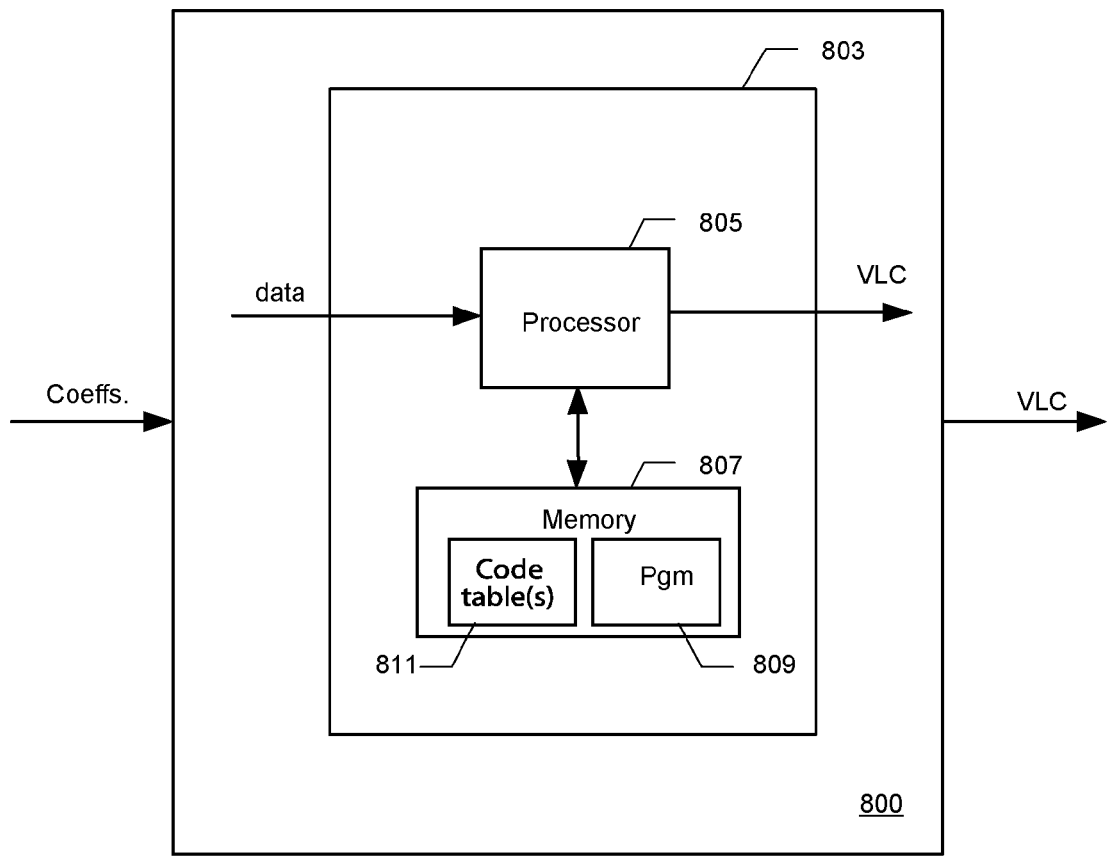
FIG. 8 shows another embodiment that includes an apparatus 800 that is operable to implement a coding method.

FIG. 8 shows another embodiment that includes an apparatus 800 that is operable to implement a coding method as described herein, e.g., as described in FIG. 1 with one embodiment using the mixed position run-length coding method, and another using the integrated position coding method. Apparatus 800 includes processing system 803 that includes one or more processors 805 and a memory 807. A single processor is shown in FIG. 8 and those in the art will appreciate that this may represent several processors. Similarly, a single memory subsystem 807 is shown, and those in the art will appreciate that the memory subsystem may include different elements such as RAM, ROM, and so forth. In addition, the memory subsystem is meant to include any non-volatile memory storage such as a magnetic or optical storage component. A computer program 809 is included and is loaded into the memory 807. Note that at any time, some of the programs may be in the different parts of the memory subsystem, as will be understood by those in the art. The program 809 includes instructions to instruct the processor to implement, in different versions, the different coding methods including the different position coding methods. In the embodiment shown, the method uses one or more coding tables 811 in the memory subsystem 807.

Figure 9:
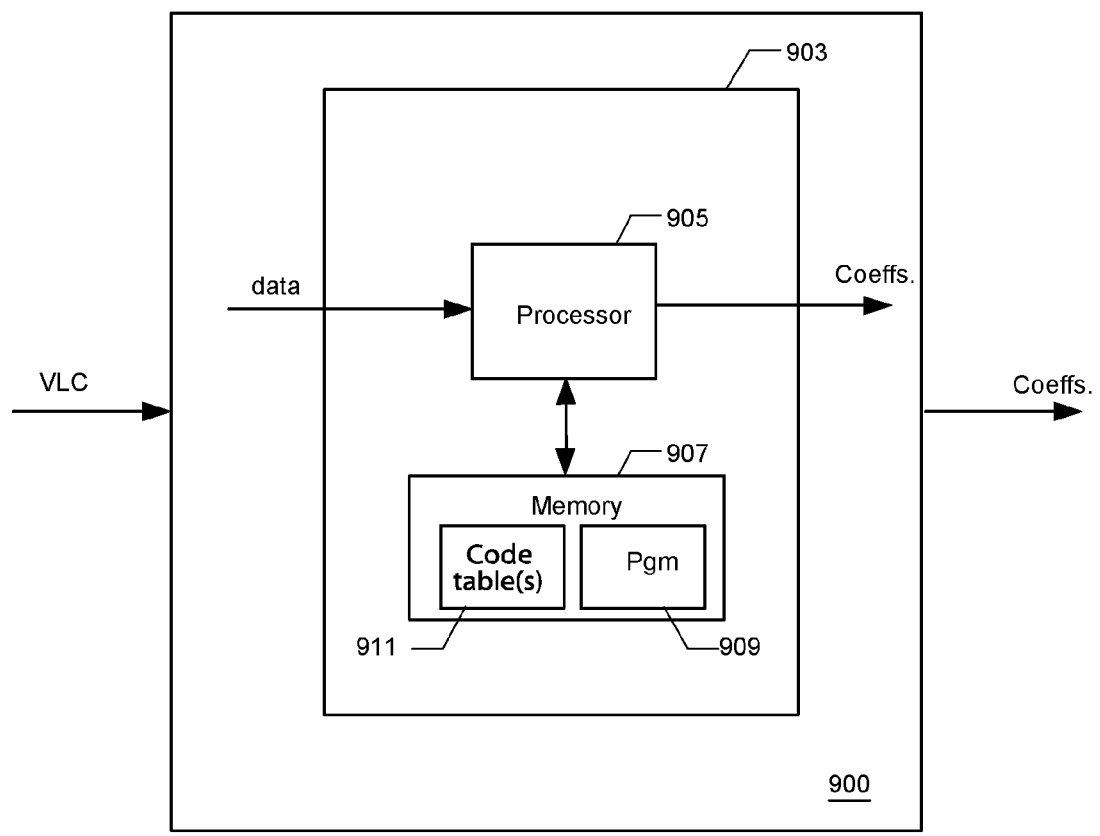
FIG. 9 shows another embodiment that includes an apparatus 900 operable to implement a decoder of a variable length coding method described herein.

FIG. 9 shows another embodiment that includes an apparatus 900 operable to implement a decoder of a variable length coding method described herein. Decoding apparatus 900 includes a processing system 903 that includes one or more processors 905 and a memory 907. A single processor is shown in FIG. 9 and those in the art will appreciate that this may represent several processors. Similarly, a single memory subsystem 907 is shown, and those in the art will appreciate that the memory subsystem may include different elements such as RAM, ROM, and so forth. In addition, the memory subsystem is meant to include any non-volatile memory storage such as a magnetic or optical storage component. A computer program 909 is included and is loaded into the memory 907. Note that at any time, some of the programs may be in the different parts of the memory subsystem, as will be understood by those in the art. The program 909 includes instructions to instruct the processor to implement, in different versions, the recognizing and decoding of codewords. In the embodiment shown, the decoding method uses one or more coding tables 911 in the memory subsystem 907.

Other embodiments include logic encoded in one or more tangible media for execution and when executed operable to carry out any of the coding methods described herein. How to implement such logic would be clear to one in the art from the description herein.

Other embodiments include logic encoded in one or more tangible media for execution and when executed operable to carry out any of the decoding methods described herein. How to implement such logic would be clear to one in the art from the description herein.

Other embodiments include software encoded in one or more computer-readable media and when executed operable to carry out any of the coding methods described herein. How to implement such software would be clear to one in the art from the description herein.

Other embodiments include software encoded in one or more computer-readable media and when executed operable to carry out any of the decoding methods described herein. How to implement such software would be clear to one in the art from the description herein.

Other embodiments include a computer-readable carrier medium carrying a set of instructions that when executed by one or more processors of a processing system cause the one or more processors to carry out any of the coding methods described herein.

Other embodiments include a computer-readable carrier medium carrying a set of instructions that when executed by one or more processors of a processing system cause the one or more processors to carry out any of the decoding methods described herein.

The term "sequence" as used herein for the sequence of quantized coefficients is sometimes referred to as a "block" of coefficients, and also as a "series" of coefficients. Those in the art will understand that such terms may be interchangeably used and the meaning would be clear to those in the art from the context.

Also, in the description, it is assumed that the sequence includes only the AC coefficients and that the DC coefficient of the transform of the block is separately encoded. How to modify the methods described herein to include the DC coefficient would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or symbols are used for the most likely-to-occur quantized value or values, and different other values or symbols are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The transform used in one embodiment is the discrete cosine transform (DCT)-like 4×4 integer transform defined in the H.264/MEG-4 AVC video coding standard/draft standard. Other embodiments use a discrete cosine transform (DCT). Other transforms also are possible. Also the bock size described herein is 4 by 4, and other block sizes also may be used in alternate embodiments.

The invention does not depend on any particular type of inter-frame coding if used, or of motion compensation if used for inter-frame coding, or any intra-estimation if used for estimating the pixels of a block using information from neighbouring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any nonzero-valued coefficients. In one version, the sign information for any runs of nonzero amplitudes in any region is added together with the information of each amplitude. In an alternate embodiment, the sign information for any runs of nonzero amplitudes in any region may be included in a different manner, e.g., as a code for the series of signs. Other alternate embodiments are also possible for encoding the sign.

Note that in some examples for amplitude encoding, a different number of possible nonzero values can be assumed for the coefficients. The invention however is not restricted to any number of possible quantization values.

Note also that the term amplitude is irrespective of sign. Therefore, for example, coefficient of values +1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing", "computing", "calculating", "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of coder, or a decoder. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, (i) in one set of embodiments, a tangible computer-readable medium, e.g., a solid-state memory, or a computer software product encoded in computer-readable optical or magnetic media; (ii) in a different set of embodiments, a medium bearing a propagated signal detectable by at least one processor of one or more processors and representing a set of instructions that when executed implement a method; (iii) in a different set of embodiments, a carrier wave bearing a propagated signal detectable by at least one processor of the one or more processors and representing the set of instructions a propagated signal and representing the set of instructions; (iv) in a different set of embodiments, a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Thus, the claims following the Description of Example Embodiments are hereby expressly incorporated into this Description of Example Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating an encoding apparatus to compress an image, the method comprising:

accepting an ordered sequence of quantized transform coefficients of a block of image data of the image into the encoding apparatus, the sequence having a most likely-to-occur amplitude, and at least one other amplitude including a next-to-most likely-to-occur amplitude, forming a joint event defined by a first parameter indicative of the number of coefficients having other than the most likely-to-occur amplitude and a second parameter indicative of the number of trailing coefficients having the next-to-most likely-to-occur amplitude;

encoding, by the encoding apparatus, the joint event using a first coding method;

encoding, by the encoding apparatus, the signs of the trailing coefficients having the next-to-most likely-to-occur amplitude;

encoding, by the encoding apparatus, the values of the coefficients having other than the most likely-to-occur amplitude using at least one level-coding coding method, the choice of level-coding method depending on at least the amplitude of the coefficient;

encoding, by the encoding apparatus, a value indicative of the total number of coefficients having the most likely-to-occur amplitude using a second coding method;

encoding, by the encoding apparatus, the positions of the coefficients having a value other than the most likely-to-occur amplitude using at least one position coding method; and concatenating, by the encoding apparatus, the results of the encodings to form a set of codewords, at least one position encoding method being selected from the set of position coding methods consisting of:

a first position coding method including repeatedly alternating encoding of (a) a run-length of a run of most likely-to-occur amplitude coefficients preceding a coefficient having other than the most likely-to-occur amplitude, and (b) a run length of a run of coefficients having amplitudes other than the most likely-to-occur amplitude and determining if alternating produces shorter codewords than no alternating, the alternating occurring according to whether alternating or not alternating is determined to produce shorter codewords; and a second position coding method including determining a first parameter and a second parameter that are indicative of the number of most likely-to-occur amplitude coefficients and the number of coefficients having other than the most likely-to-occur amplitude whose positions remain to be coded; and jointly encoding the positions of the coefficients according to the first and second parameters using a variable length coding mapping that provides for any pair of parameter values all possible position patterns that have those parameter values, such that relatively more likely-to-occur sequences of quantized coefficients are represented by relatively short sets of codewords and relatively less likely-to-occur sequences of quantized coefficients are represented by relatively long sets of codewords.

2. A method as recited in claim 1, wherein at least some of the first, second, level-coding methods, and position coding method or methods are variable length coding methods, each variable length coding method configured such that relatively more likely-to-occur sequences of quantized coefficients are represented by relatively short sets of codewords and relatively less likely-to-occur sequences of quantized coefficients are represented by relatively long sets of codewords.

3. A method as recited in claim 1,
wherein at least some of the first, second, level-coding methods, and position coding method or methods are variable length coding methods, each variable length coding method configured such that relatively more likely-to-occur sequences of quantized coefficients are represented by relatively short sets of codewords and relatively less likely-to-occur sequences of quantized coefficients are represented by relatively long sets of codewords,
wherein the encoding of the positions includes repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other, and
wherein whether a run-length of most likely-to-occur amplitude coefficients or a run-length of other than the most likely-to-occur amplitude coefficients is encoded depends on a function of the number of most likely-to-occur amplitude coefficients remaining to be coded and the number of other than the most likely-to-occur amplitude coefficients remaining to be coded.

4. A method as recited in claim 3,
wherein any encoding of one or more run-lengths of runs of consecutive most likely-to-occur amplitude coefficients preceding a coefficient having other than the most likely-to-occur amplitude proceeds starting with a run ending with the highest frequency coefficient having other than the most likely-to-occur amplitude and proceeding to runs ending with lower frequency coefficients having other than the most likely-to-occur amplitude, and
wherein any encoding of one or more run-lengths of runs of coefficients having amplitudes other than the most likely-to-occur amplitude proceeds in the forward direction starting with a run starting with the lowest frequency coefficient having amplitudes other than the most likely-to-occur amplitude.

5. A method as recited in claim 1,
wherein at least some of the first, second, level-coding methods, and position coding method or methods are variable length coding methods, each variable length coding method configured such that relatively more likely-to-occur sequences of quantized coefficients are represented by relatively short sets of codewords and relatively less likely-to-occur sequences of quantized coefficients are represented by relatively long sets of codewords,
wherein the encoding of the positions includes:
determining a first parameter and a second parameter that are indicative of the number of most likely-to-occur amplitude coefficients and the number of coefficients having other than the most likely-to-occur amplitude whose positions remains to be coded; and
jointly encoding the positions of the coefficients according to the first and second parameters using a variable length coding mapping that provides for any pair of parameter values all possible position patterns that have those parameter values.

6. A method as recited in claim 5,
wherein the determining of the first and second parameters is up to a predefined maximum value for each parameter, and wherein variable length coding mappings are provided for pairs of parameters up to the maximum parameter value or values, and the wherein the jointly encoding is repeated until either parameter indicates no more coefficient positions need to be encoded.

7. A method as recited in claim 6, wherein each variable length coding mapping includes a variable length coding table.

8. A method as recited in claim 1, wherein the sequence is such that zero is the most likely-to-occur amplitude and 1 is the next to most likely-to-occur amplitude.

9. A method of operating an encoding apparatus to compress an image, the method comprising:
transforming, by the encoding apparatus, of a block of image data to obtain a set of coefficients;
quantizing, by the encoding apparatus, the set of coefficients to obtain set of quantized transform coefficients, such that the set of quantized transform coefficients has a most likely-to-occur amplitude, and at least one other amplitude including a next-to-most likely-to-occur amplitude;
ordering, by the encoding apparatus, the set of quantized transform coefficients to obtain an ordered sequence of quantized transform coefficients of the block of image data; and
encoding, by the encoding apparatus, the sequence of quantized transform coefficients using a context-based adaptive variable length coding method, the context-based adaptive variable length coding method including encoding the positions of the coefficients having a value other than the most likely-to-occur amplitude using at least one position coding method selected from the set of position coding methods consisting of:
a first position coding method including repeatedly alternating encoding of (a) a run-length of a run of most likely-to-occur amplitude coefficients preceding a coefficient having other than the most likely-to-occur amplitude, and (b) a run length of a run of coefficients having amplitudes other than the most likely-to-occur amplitude and determining if alternating produces shorter codewords than no alternating, the alternating occurring according to whether alternating or not alternating is determined to produce shorter codewords; and
a second position coding method including determining a first parameter and a second parameter that are indicative of the number of most likely-to-occur amplitude coefficients and the number of coefficients having other than the most likely-to-occur amplitude whose positions remain to be coded; and jointly encoding the positions of the coefficients according to the first and second parameters using a variable length coding mapping that provides for any pair of parameter values all possible position patterns that have those parameter values,
such that relatively more likely-to-occur sequences of quantized coefficients are represented by relatively short sets of codewords and relatively less likely-to-occur sequences of quantized coefficients are represented by relatively long sets of codewords.

10. A method as recited in claim 9, wherein the context-based adaptive variable length coding method further includes:

forming a joint event defined by a first parameter indicative of the number of coefficients having other than the most likely-to-occur amplitude and a second parameter indicative of the number of trailing coefficients having the next-to-most likely-to-occur amplitude;

encoding the joint event using a first coding method;

encoding the signs of the trailing coefficients having the next-to-most likely-to-occur amplitude;

encoding the values of the coefficients having other than the most likely-to-occur amplitude using at least one level-coding coding method,the choice of level-coding method depending on at least the amplitude of the coefficient;

encoding a value indicative of the total number of coefficients having the most likely-to-occur amplitude using a second coding method; and concatenating the results of the encodings to form a set of codewords.

11. A method as recited in claim 10, wherein at least some of the first, second, level-coding methods, and position coding method or methods are variable length coding methods, each variable length coding method configured such that relatively more likely-to-occur sequences of quantized coefficients are represented by relatively short sets of codewords and relatively less likely-to-occur sequences of quantized coefficients are represented by relatively long sets of codewords, wherein the position coding method includes repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other, and wherein whether a run-length of most likely-to-occur amplitude coefficients or a run-length of other than the most likely-to-occur amplitude coefficients is encoded depends on a function of the number of most likely-to-occur amplitude coefficients remaining to be coded and the number of other than the most likely-to-occur amplitude coefficients remaining to be coded.

12. A method as recited in claim 11, wherein any encoding of one or more run-lengths of runs of consecutive most likely-to-occur amplitude coefficients preceding a coefficient having other than the most likely-to-occur amplitude proceeds starting with a run ending with the highest frequency coefficient having other than the most likely-to-occur amplitude and proceeding to runs ending with lower frequency coefficients having other than the most likely-to-occur amplitude, and wherein any encoding of one or more run-lengths of runs of coefficients having amplitudes other than the most likely-to-occur amplitude proceeds in the forward direction starting with a run starting with the lowest frequency coefficient having amplitudes other than the most likely-to-occur amplitude.

13. A method as recited in claim 10, wherein at least some of the first, second, level-coding methods, and position coding method or methods are variable length coding methods, each variable length coding method configured such that relatively more likely-to-occur sequences of quantized coefficients are represented by relatively short sets of codewords and relatively less likely-to-occur sequences of quantized coefficients are represented by relatively long sets of codewords, wherein the position coding method includes:

determining a first parameter and a second parameter that are indicative of the number of most likely-to-occur amplitude coefficients and the number of coefficients having other than the most likely-to-occur amplitude whose positions remains to be coded; and jointly encoding the positions of the coefficients according to the first and second parameters using a variable length coding mapping that provides for any pair of parameter values all possible position patterns that have those parameter values.

14. A method as recited in claim 13, wherein the determining of the first and second parameters is up to a predefined maximum value for each parameter, and wherein variable length coding mappings are provided for pairs of parameters up to the maximum parameter value or values, and the wherein the jointly encoding is repeated until either parameter indicated no more coefficient positions need to be encoded.

15. A method as recited in claim 14, wherein each variable length coding mapping includes a variable length coding table.

16. A method as recited in claim 9, wherein the sequence is such that zero is the most likely-to-occur amplitude and 1 is the next to most likely-to-occur amplitude.

17. A computer-readable hardware storage medium storing instructions that when executed by one or more processors cause carrying out a method, the method comprising:

for an ordered sequence of quantized transform coefficients of a block of image data, the sequence having a most likely-to-occur amplitude, and at least one other amplitude including a next-to-most likely-to-occur amplitude, encoding the ordered sequence using a context-based adaptive variable length coding method, the context-based adaptive variable length coding method including:

encoding the positions of the coefficients having a value other than the most likely-to-occur amplitude using at least one position coding method selected from the set of position coding methods consisting of:

a first position coding method including repeatedly alternating encoding of (a) a run-length of a run of most likely-to-occur amplitude coefficients preceding a coefficient having other than the most likely-to-occur amplitude, and (b) a run length of a run of coefficients having amplitudes other than the most likely-to-occur amplitude and determining if alternating produces shorter codewords than no alternating, the alternating occurring according to whether alternating or not alternating is determined to produce shorter codewords; and a second position coding method including determining a first parameter and a second parameter that are indicative of the number of most likely-to-occur amplitude coefficients and the number of coefficients having other than the most likely-to-occur amplitude whose positions remains to be coded; and jointly encoding the positions of the coefficients according to the first and second parameters using a variable length coding mapping that provides for any pair of parameter values all possible position patterns that have those parameter values, such that relatively more likely-to-occur sequences of quantized coefficients are represented by relatively short sets of codewords and relatively less likely-to-occur sequences of quantized coefficients are represented by relatively long sets of codewords.

18. A computer-readable hardware storage medium as recited in claim 17, wherein the first and second position coding methods each include using at least one variable length coding method.

19. A computer-readable hardware storage medium as recited in claim 17,
wherein the first position coding method includes using at least one variable length coding method,
wherein the position encoding includes repeatedly encoding either a run-length of a run of most likely-to-occur amplitude coefficients preceding a coefficient having other than the most likely-to-occur amplitude, or a run length of a run of coefficients having amplitudes other than the most likely-to-occur amplitude interchangeably, either one or the other, and
wherein whether a run-length of most likely-to-occur amplitude coefficients or a run-length of other than the most likely-to-occur amplitude coefficients is encoded depends on a function of the number of most likely-to-occur amplitude coefficients remaining to be coded and the number of other than the most likely-to-occur amplitude coefficients remaining to be coded.

20. A computer-readable hardware storage medium as recited in claim 19,
wherein any encoding of one or more run-lengths of runs of consecutive most likely-to-occur amplitude coefficients preceding a coefficient having other than the most likely-to-occur amplitude proceeds starting with a run ending with the highest frequency coefficient having other than the most likely-to-occur amplitude and proceeding to runs ending with lower frequency coefficients having other than the most likely-to-occur amplitude, and
wherein any encoding of one or more run-lengths of runs of coefficients having amplitudes other than the most likely-to-occur amplitude proceeds in the forward direction starting with a run starting with the lowest frequency coefficient having amplitudes other than the most likely-to-occur amplitude.

21. A computer-readable hardware storage medium as recited in claim 17,
wherein at least some of the first, second, level-coding methods, and position coding method or methods are variable length coding methods, each variable length coding method configured such that relatively more likely-to-occur sequences of quantized coefficients are represented by relatively short sets of codewords and relatively less likely-to-occur sequences of quantized coefficients are represented by relatively long sets of codewords,
wherein the encoding of the positions includes:
determining a first parameter and a second parameter that are indicative of the number of most likely-to-occur amplitude coefficients and the number of coefficients having other than the most likely-to-occur amplitude whose positions remains to be coded; and
jointly encoding the positions of the coefficients according to the first and second parameters using a variable length coding mapping that provides for any pair of parameter values all possible position patterns that have those parameter values.

22. A computer-readable hardware storage medium as recited in claim 21,
wherein the determining of the first and second parameters is up to a predefined maximum value for each parameter, and wherein variable length coding mappings are provided for pairs of parameters up to the maximum parameter value or values, and the wherein the jointly encoding is repeated until either parameter indicated no more coefficient positions need to be encoded.

23. A computer-readable hardware storage medium as recited in claim 17, wherein the sequence is such that zero is the most likely-to-occur amplitude and 1 is the next to most likely-to-occur amplitude.

24. An apparatus comprising:
a context-based adaptive variable length encoder including one or more processors coupled to a memory, operative to encode an ordered sequence of quantized transform coefficients of a block of image data, the sequence having a most likely-to-occur amplitude, and at least one other amplitude including a next-to-most likely-to-occur amplitude, the context-based adaptive variable length encoder including a position encoder operative to encode the positions of the coefficients having a value other than the most likely-to-occur amplitude using at least one position coding method selected from the set of position coding methods consisting of:
a first position coding method including repeatedly alternating encoding of (a) a run-length of a run of most likely-to-occur amplitude coefficients preceding a coefficient having other than the most likely-to-occur amplitude, and (b) a run length of a run of coefficients having amplitudes other than the most likely-to-occur amplitude and determining if alternating produces shorter codewords than no alternating, the alternating occurring according to whether alternating or not alternating is determined to produce shorter codewords; and
a second position coding method including determining a first parameter and a second parameter that are indicative of the number of most likely-to-occur amplitude coefficients and the number of coefficients having other than the most likely-to-occur amplitude whose positions remains to be coded; and jointly encoding the positions of the coefficients according to the first and second parameters using a variable length coding mapping that provides for any pair of parameter values all possible position patterns that have those parameter values, such that relatively more likely-to-occur sequences of quantized coefficients are represented by relatively short sets of codewords and relatively less likely-to-occur sequences of quantized coefficients are represented by relatively long sets of codewords.

25. An apparatus as recited in claim 24, wherein at least one of the position coding methods is a variable length coding method, each variable length coding method configured such that relatively more likely-to-occur sequences of quantized coefficients are represented by relatively short sets of codewords and relatively less likely-to-occur sequences of quantized coefficients are represented by relatively long sets of codewords.

26. An apparatus as recited in claim 24, wherein the sequence is such that zero is the most likely-to-occur amplitude and 1 is the next to most likely-to-occur amplitude.

* * * * *

UNITED STATES PATENT AND TRADEMARK OFFICE
CERTIFICATE OF CORRECTION

PATENT NO.        : 8,144,784 B2
APPLICATION NO.   : 11/774745
DATED             : March 27, 2012
INVENTOR(S)       : Tian et al.

It is certified that error appears in the above-identified patent and that said Letters Patent is hereby corrected as shown below:

In Column 5, line 26, after "where", kindly insert --i--.

In Column 7, line 34, before "denote", kindly replace "run_before_(j)" with --run_before_z(j)--.

In Column 7, line 65, after "and", kindly replace "'run_before_(j)'" with --"run_before_z(j)"--.

In Column 8, line 2, after "and", kindly replace "run_before_(j)" with --run_before_z(j)--.

Signed and Sealed this
Twenty-eighth Day of August, 2012

David J. Kappos
*Director of the United States Patent and Trademark Office*